United States Patent [19]

Lindberg et al.

[11] Patent Number: 4,543,621
[45] Date of Patent: Sep. 24, 1985

[54] SPIRAL TRACK DISK DRIVE

[75] Inventors: Charles A. Lindberg, Menlo Park; William R. Maclay, Los Gatos; Lauren V. Merritt, Los Altos, all of Calif.

[73] Assignee: Datacopy Corporation, Mountain View, Calif.

[21] Appl. No.: 386,862

[22] Filed: Jun. 10, 1982

[51] Int. Cl.$^4$ .............................. G11B 5/52; G11B 5/58
[52] U.S. Cl. ........................................ 360/77; 360/70; 360/73
[58] Field of Search ................ 360/70, 73, 77; 369/43

[56] References Cited

U.S. PATENT DOCUMENTS

| | | | |
|---|---|---|---|
| 3,126,535 | 3/1964 | Streeter | 360/77 |
| 3,509,274 | 4/1970 | Kihara | 360/73 |
| 4,067,044 | 1/1978 | Maeda et al. | 358/128 |
| 4,142,209 | 2/1979 | Hedlund et al. | 358/128 |
| 4,151,569 | 4/1979 | Hathaway | 360/77 |
| 4,151,570 | 4/1979 | Ravizza et al. | 360/77 |
| 4,160,270 | 7/1979 | Goldschmidt et al. | 358/128 |
| 4,351,044 | 9/1982 | Imanaka et al. | 369/43 |

FOREIGN PATENT DOCUMENTS 0056712 7/1982 European Pat. Off. .............. 369/43

Primary Examiner—George G. Stellar
Attorney, Agent, or Firm—Owen L. Lamb

[57] ABSTRACT

A disk drive that generates a smooth spiral during the recording of data so that the recording operation is continuous. A magnetic read/write head (2) is mounted on an arm (4) so that it can move generally along a radius of a disk (8). A rotary motor (12) is used to spin the disk and to drive a gear train. The output of the gear train is used to move the arm-mounted head across the disk. The pitch of the spiral generated is controlled by the relative gear ratio between the disk and the head mechanism. Rapid retrace of the head mechanism to its starting position is accomplished by placing a return spring (56) on the head mechanism and a clutch (42) in the gear train. The location of the clutch in the gear train is chosen so that the head mechanism, while being returned to the starting position under spring power, spins a neutral pitch fan (102). The energy dissipated by churning the air by the fan limits the peak velocity of the head mechanism. The clutch mechanism itself is designed to give essentially no sliding friction during the retrace operation so that the final position achieved is repeatable. The connection from the gear train to the head mechanism is made variable, under the control of a second motor (68, 74), so that the head can be made to follow the previously-recorded track for playback. The track following is done by dithering the head and using the demodulated head output as a steering signal.

8 Claims, 8 Drawing Figures

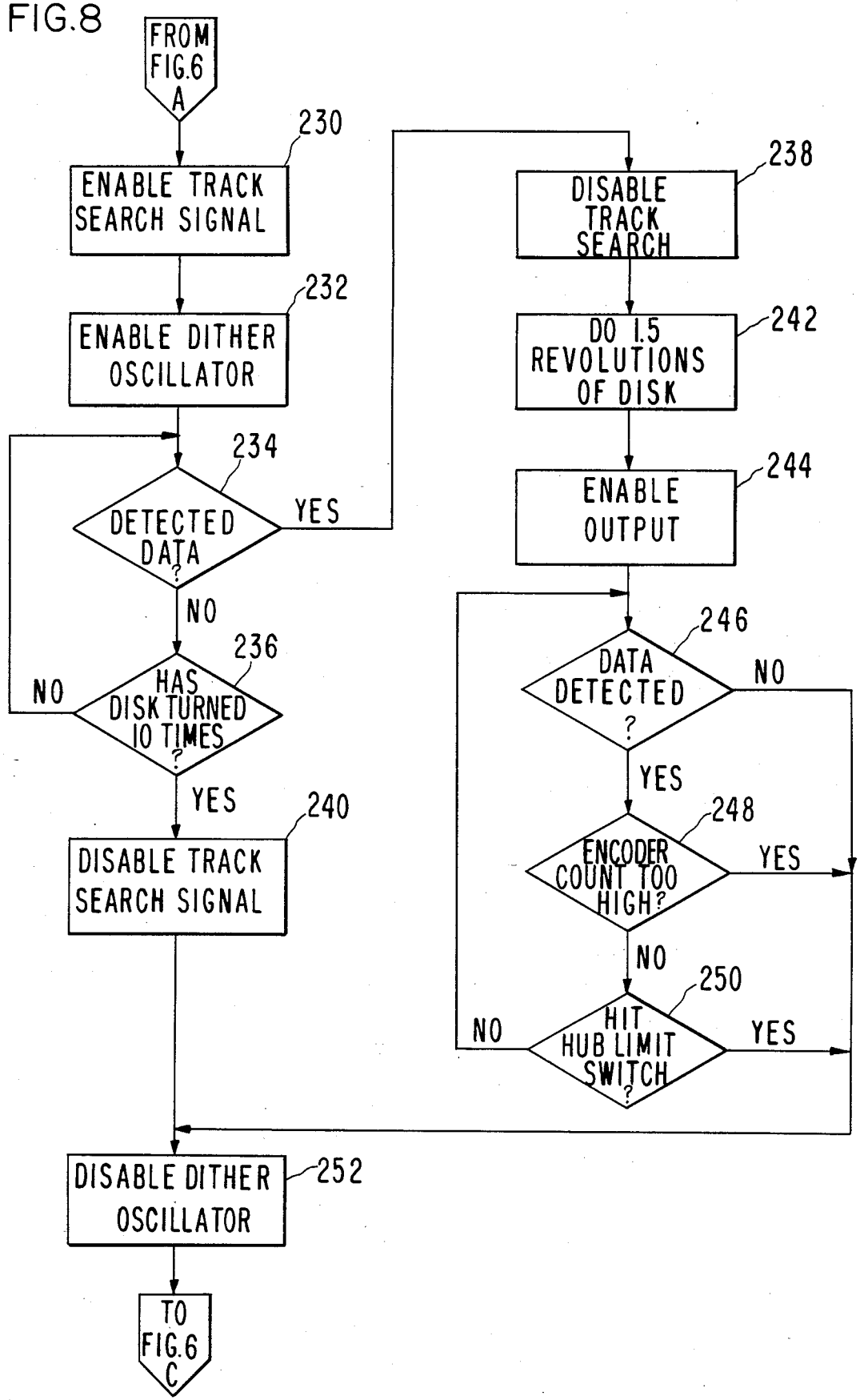

SPIRAL TRACK DISK DRIVE

CROSS-REFERENCE TO RELATED APPLICATIONS

U.S. patent application Ser. No. 06/265,411 of Armin Miller, et al., entitled "Electronic Camera with Means for Recording Optical Images," filed May 19, 1981, and assigned to Datacopy Corporation.

U.S. Pat. No. 4,458,278 of Armin Miller, et al., entitled "Disk-Centering Mechanism for Use with a High-Density flexible Disk," granted on July 3, 1984 and assigned to Datacopy Corporation.

U.S. patent application Ser. No. 371,862 of Armin Miller, et al., entitled "Image Reader for Use with an Electronic Camera," filed on Apr. 26, 1982, and assigned to Datacopy Corporation.

BACKGROUND OF THE INVENTION

1. Field of the Invention

The invention relates to moving media storage technology and, more particularly, to a method and apparatus for the recording of large blocks of rapidly arriving data and for the playback of such recordings.

2. Description of the Prior Art

Disk drives have been used in the computer industry for many years for the storage of data for later use. The economic factors in the industry have caused the development of a series of disk drives that have progressively been smaller and cheaper, and that have both more storage capacity and faster access times. Throughout their history, however, they have only had to deal with small blocks of data, or with blocks of data that arrived slowly enough to be subdivided. Thus the data could be stored in distinct sectors on distinct tracks on the disk. Furthermore, organizing the disk's storage capability in this fashion allows the retrieval and changing of any particular block of data.

In the above-referenced copending patent application, Ser. No. 06/256,411, of Armin Miller, et al., there is described a high resolution electronic camera with storage capability. The image at the focal plane of a lens is scanned in one direction by a linear photodiode array and in the orthogonal direction by relative motion of the linear array with respect to the lens. Since the linear array has about 2,000 photoactive elements, a scan of a standard $8\frac{1}{2}'' \times 11''$ page results in over five million data points. Presently-available disk drives with this much storage capability are very much larger than the mechanism required to do the described scanning. An unconventional and unique disk drive would be required to keep the total package size reasonable.

The photodiode array converts photons to electrons. The gain of the device is specified in terms of output charge versus illumination level. This gain is directly proportional to the length of time allowed to collect the photon-generated electrons before presenting the collection at the output. Thus, the cycling of the linear array is crystal controlled and never varies. The mechanical scanning of the array across the image plane of the lens is similarly well controlled. The array must advance exactly one photodiode width for every cycling of the diodes of the array. Any variation in this will generate a magnification error as successive scans of the linear array are mechanically unexpectedly too close together, or too far apart. Thus, the rhythm of making an exposure, and recording it, is set by the camera and cannot be set by the recording disk drive. The conventional way to connect the camera to a disk would be to buffer the data flow from the camera so that sector identification codes and track jumps can be accommodated. Such a buffer would add to the cost, volume, and weight of the final product. The alternative was to invent a new and unique disk drive that had neither sectoring nor track jumping.

The removal of sectoring was relatively straightforward. There is no need to get at random sections of a block of data when the data comes in one integrated whole, like the output of an electronic camera. Thus, sectoring could be dropped without its function being picked up in some fashion elsewhere.

The removal of track jumping was complicated by several considerations. Some way of moving from one track to another is obviously necessary; the problem was to do it in a systematic fashion so that recording could continue without interruption and so that playback would be possible. The situation was further complicated by the necessity of using flexible disks, rather than hard disks, because their replacement costs are much lower. A person taking pictures effectively with a disk drive is going to be using a lot of disks, and they must be individually relatively inexpensive. The final complication was that, in order to get the required amount of data stored on a disk of reasonable size, the state-of-the-art of floppy-disk drives had to be improved by a factor of ten or twenty. This improvement was accomplished mainly through the invention of an improved mechanism that achieved greater track densities.

The above-referenced applications by Miller, et al. describes certain aspects of the data storage and retrieval problems described above, but only with respect to the development of a high-resolution camera with storage. No claims were made of the innovations that are unique and useful with respect to the general data storage and retrieval industry.

Accordingly, a primary object of this invention is to rapidly record a large block of data at low cost.

It is another object of this invention to increase greatly the storage capacity of floppy-disk drives.

It is a further object of this invention to record data onto a disk in a spiral format.

It is a yet further object of this invention to accomplish track following during the playback of data recorded on a spiral.

The foregoing and other objects, features, and advantages of the invention will be apparent from the following detailed description of the preferred embodiments of the invention as illustrated in the accompanying drawings.

SUMMARY OF THE INVENTION

Briefly, the above objects are accomplished in accordance with the present invention by providing a disk drive that generates a smooth spiral during the recording of data so that the recording operation is continuous, and by superimposing onto the spiral generating mechanism during playback, the capability of modifying the instantaneous head position so that the recorded track can be followed. A magnetic read/write head is mounted so that it can move generally along a radius of a disk. A rotary motor is used to spin the disk and to drive a gear train. The output of the gear train is used to move the mounted head across the disk. The pitch of the spiral generated is controlled by the relative gear ratio between the disk and the head mechanism. Rapid retrace of the head mechanism to its starting position is accomplished by placing a return spring on the head mechanism and a clutch in the gear train. The location of the clutch in the gear train is chosen so that while the head mechanism is being returned to the starting position under spring power, a neutral pitch fan is spun at high speed. The energy dissipated by churning the air by the fan limits the peak velocity of the head mechanism. The clutch mechanism itself is designed to give essentially no sliding friction during the retrace operation so that the final position achieved is repeatable.

The apparatus described so far will reliably generate a spiral over and over again. The operation of the clutch, however, scrambles the relationship between the disk and the head so that a second spiral is not likely to exactly coincide with an earlier spiral. Removing and reinserting the disk from the drive will also scramble the orientation of the spiral. Furthermore, two disk drives will not, due to manufacturing variations, generate the same pitch spiral. Thus, the connection from the gear train to the head mechanism is made variable, under the control of a second motor, so that the head can be made to follow the previously-recorded track. The track following can be done by dithering the head and using the demodulated head output as a steering signal, as described in the above-referenced patent application Ser. No. 371,862 of Armin Miller, et al.

The foregoing and other objects, features, and advantages of the invention will be apparent from the following more detailed description of a preferred embodiment of the invention, as illustrated in the accompanying drawings and their descriptions.

BRIEF DESCRIPTION OF THE DRAWINGS

FIGS. 6-8 comprise a flow chart of the operation performed by the circuits shown in FIG. 5.

DESCRIPTION OF THE PREFERRED EMBODIMENT

Figure 1:
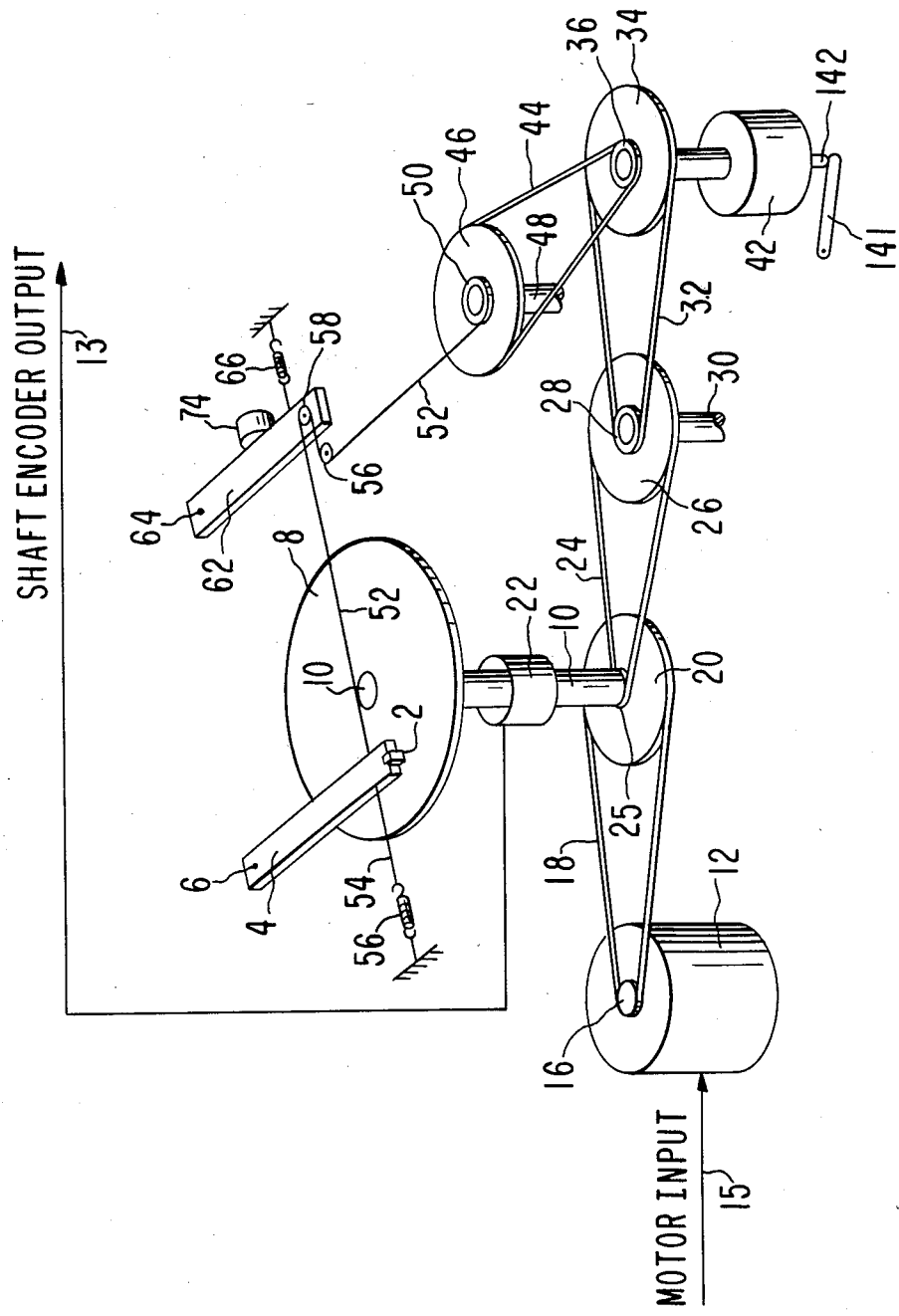
FIG. 1 is perspective view of a disk drive in which the present invention may be embodied.
Figure 5:
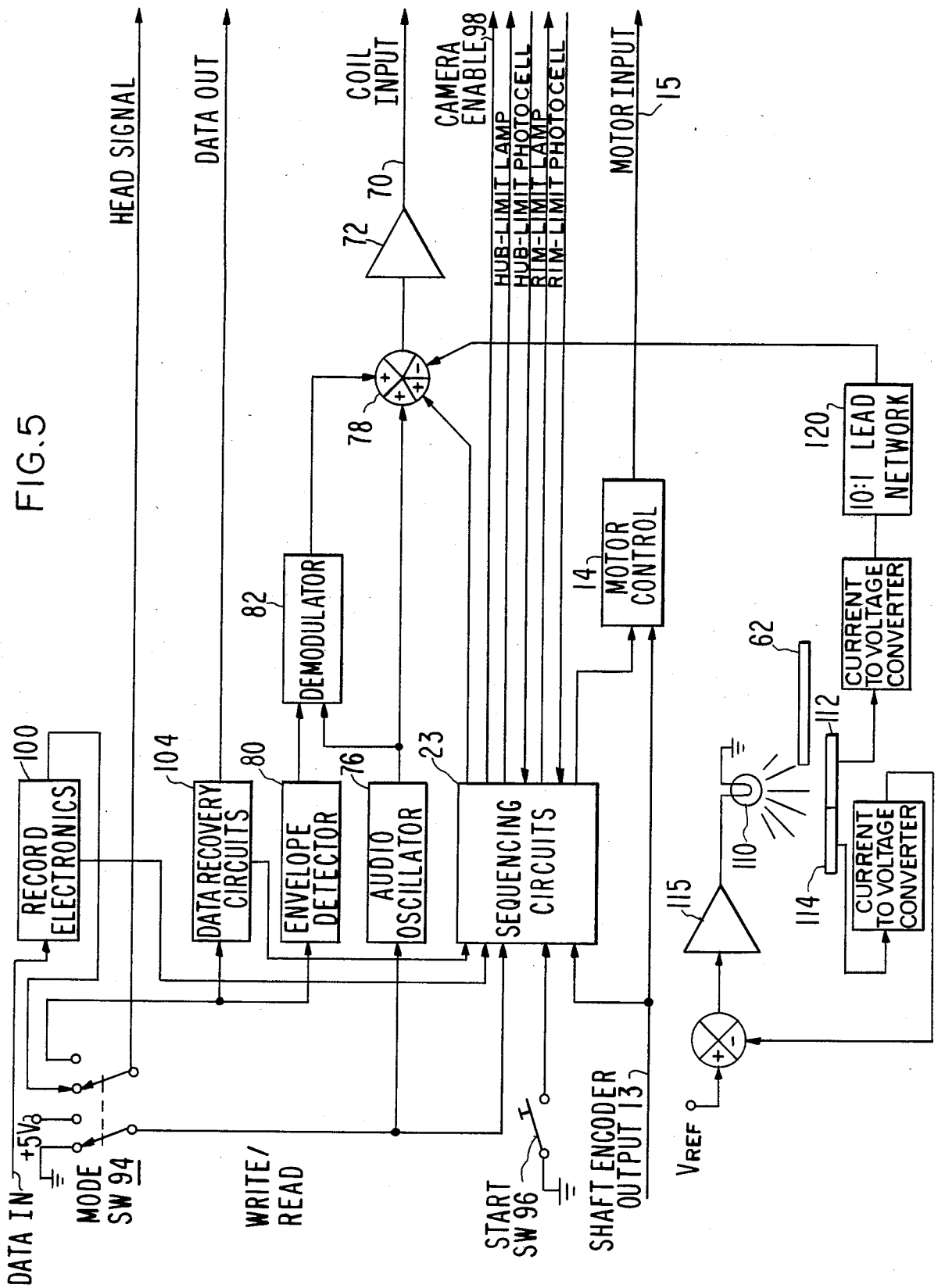

Referring to FIG. 1, a magnetic read/write head (2) is mounted on an arm (4) which rotates on pivot or bearings (6). The arm (4) is so positioned that head (2) moves in a generally radial direction across the surface of a disk (8). Disk (8) is mounted to a shaft (10). A rotary motor (12), controlled by motor input (15) from motor control electronics (14) of FIG. 5, is equipped with a motor pulley (16), which is connected by a belt (18) to a first shaft pulley (20) on shaft (10) so that the disk (8) can be spun by the motor (12). Shaft (10) is equipped with a rotary incremental encoder (22) which provides information (shaft encoder output, 13) on the position and speed of shaft (10) to the motor control electronics (14) and to the sequencing circuits (23) of FIG. 5. The use of a belt (18) and pulleys (16, 20) between the motor (12) and the shaft (10) serves to isolate the disk from the motor vibrations and cogging, and avoids the mechanical complexity of having the motor on the same shaft as the disk. Selecting the diameters of the pulleys (16, 20) for a speed reduction allows the motor (12) to run at a more efficient operating point.

The shaft (10) is equipped with second shaft pulley (25) which transmits torque through a second belt (24) to an intermediate two-pulley set (26, 28) on shaft (30). The torque is passed onward via a third belt (32) to a clutched-controlled two-pulley set (34, 36) on coaxial shafts (38, 40 shown in FIGS. 3 and 4) which are joined, or disconnected, by a clutch mechanism (42). The clutch mechanism (42) is described below with reference to FIGS. 3 and 4. A fourth belt (44) carries the torque onward to pulley (46) on shaft (48) which is equipped with a drum (50) on which the first end of a cable (52) may be wound or unwound.

Figure 2:
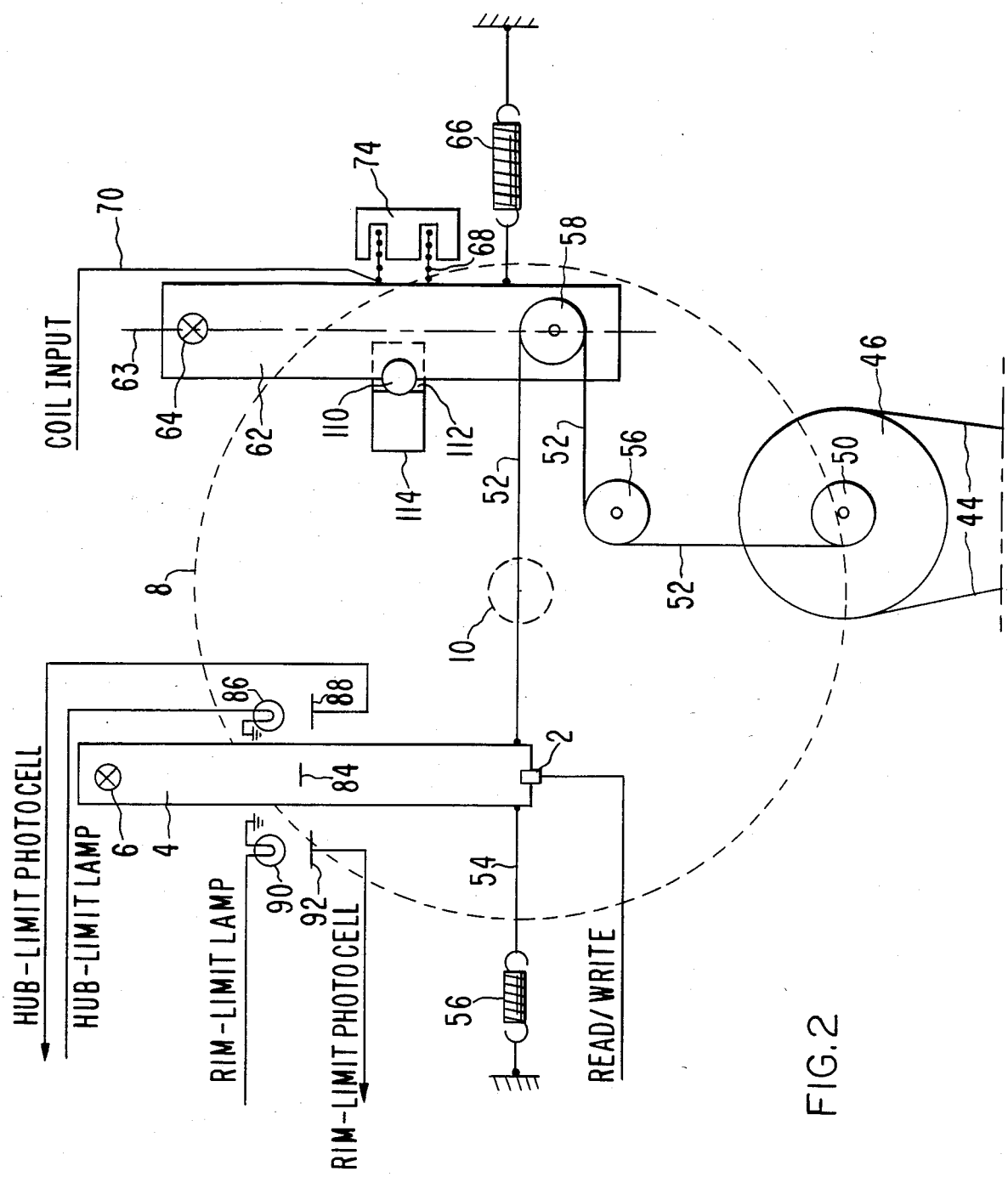
FIG. 2 is a top view of the read/write head and arm and the track-following mechanism shown in FIG. 1.

Referring now to FIG. 2, the other end of cable (52) is anchored on arm (4) and is kept taut by a second cable (54) that goes from arm (4) to spring (56), which in turn is tied to the frame. With clutch (42) disengaged, spring (56) will pull arm (4) in one direction across the disk (8) until a stop (not shown) is hit. As the disk (8) is spun by motor (12), when clutch (42) is engaged, the slow wrap-up of cable (52) onto drum (50) will pull the arm (4) in the opposite direction, generating a spiral track on the disk (8).

It does not matter if the home position of arm (4), which spring (56) pulls it to, is towards the center of the disk (8), or on the rim. If data-packing density is of real concern, however, the speed of the motor (12) is programmed to change as the position of arm (4) changes so that the linear surface speed of the media under the head (2) stays constant. It is then more convenient to have the home position on the rim of the disk (8). Upon start-up, the disk speed will jump to a moderate speed, then increase slowly as the recording progresses. This is clearly easier to do than to jump to an initial high speed, then decrease slowly as the recording proceeds.

As an alternative, arm (4) may have a linear motion rather than the rotary motion described, and meshing gears may be used instead of belts and pulleys, although the belts and pulleys run quieter. Furthermore, the function of spring (56) can be performed by a torsion spring working around pivot (6). These and other alternatives are within the spirit and scope of the invention, so long as the recording by head (2) generates a spiral track on the disk (8).

The above-described mechanism generates excellent spiral tracks, and thus can be used to make spiral recordings. A different mechanism is desirable for playback for two reasons. First, the location of the start of the track is not known, particularly once a disk has been removed from the drive. Second, the pitch of the spiral generated will be different for different machines no matter how carefully drum (50) is made. Thus, an active track-follower mechanism for playback is required. Track following during playback is done as follows.

Referring to FIG. 2, a preferred embodiment of the invention will now be described. Cable (52), as it goes from drum (50) to arm (4), loops around a first idler (56) and a second idler (58), mounted on a dithering arm (62). Dithering arm (62) rotates around a pivot (64) and is held in nominal position by spring (66). If the dithering arm (62) is stationary, the interaction between drum (50) and head arm (4) is as previously described. If dithering arm (62) were to move, however, head arm (4) would move as well, by forces transmitted through the cable (52). As shown in FIG. 2, cable (52) approaches and leaves dithering arm (62) perpendicular to a line (63) between the center of idler (58) and pivot (64) of dithering arm (62). This cable and pulley arrangement has a mechanical advantage of 2, so a 1.0 mil displacement of the center of idler (58) causes a 2.0 mil displacement of the attachment point of cable (52) onto head arm (4), and causes idler (58) to rotate. Alternate cable and pulley arrangements are possible. By way of example, but not limited thereto, cable (52) may be arranged to approach idler (58) from arm (4) perpendicular to the line (63), make only a quarter-turn around idler (58), and leave parallel to the line (63). This arrangement gives a mechanical advantage of one, and idler (58) will not rotate with respect to the cable (52) as dithering arm (62) moves.

These and other alternatives are within the spirit and scope of the invention, so long as the position of head arm (4) is no longer controlled just by the rotation of drum (50) as described with respect to recording, and a second means for controlling it exists for playback. Note that drum (50) will continue to provide most of the motion of the head arm (4); dithering arm (62) will only have to handle the manufacturing tolerances in the cable (52) and drum (50) interface, and a couple of track widths more.

In accordance with a preferred embodiment of the invention, the motion of the dithering arm (62) is controlled as follows. A cylindrical coil structure (68) is mounted on dithering arm (62) so that its axis is in the plane of motion of dithering arm (62) and is perpendicular to the line (63). A magnet structure (74) is positioned to give maximum magnetic flux through the coil (68); the resulting combination of coil (68) and magnet (74) being an audio speaker-style linear motor. Linear motors of this type are often used in present hard disk drives; this one is unique in that it only needs a very short stroke. Alternative embodiments are possible. Dithering arm (62) could be attached via pivot (64) to the shaft of a rotary, limited rotation, torque motor. Alternately, dithering arm (62) could itself be the armature of a linear motor mechanism.

These and other alternatives are within the spirit and scope of the invention, so long as some force-generating transducer is combined with a structure to give small-motion capability to cable (52) and thus to head arm (4).

Figure 3:
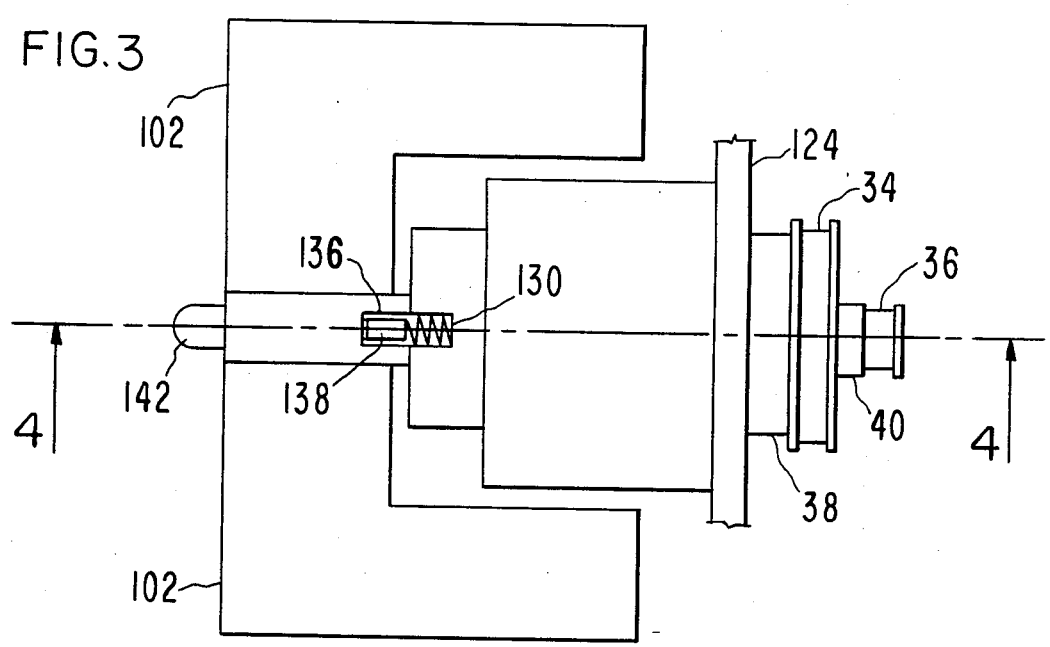
FIG. 3 is a side view of the clutch mechanism shown in FIG. 1.
Figure 4:
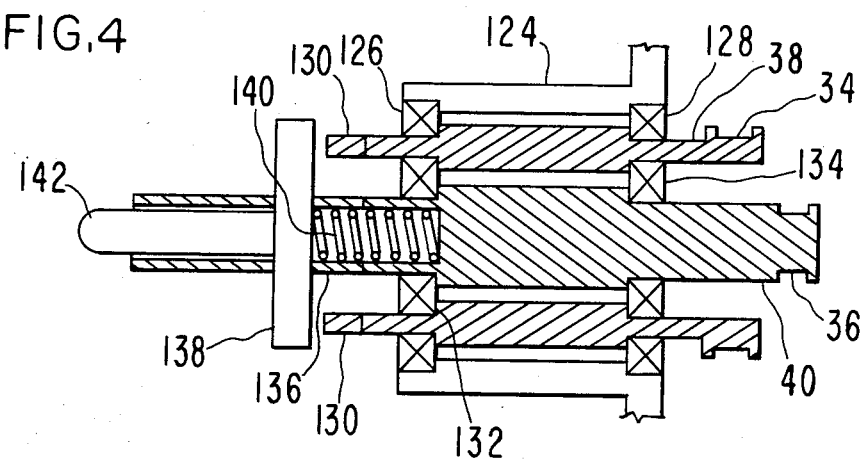
FIG. 4 is a cross-sectional view taken along view lines 4—4 of the clutch mechanism shown in FIG. 3; and, FIG. 5 is a block diagram of the control electronics for controlling the mechanisms shown in FIGS. 1 and 2.

Refer now to FIG. 3, which is a side view of the clutch mechanism shown in FIG. 1, and FIG. 4 which is a cross-sectional view taken along view lines 4—4 of the clutch mechanism shown in FIG. 3. Torque arrives from motor (12) to pulley surface (34) on shaft (38) and leaves on pulley surface (36) on shaft (40). The clutch serves to connect or disconnect these two shafts.

Shaft (38) is mounted to frame (124) through bearings (126) and (128). Its extension outboard of the bearing pair has multiple cylindrical surfaces that form a pulley (34). Its extension outboard of the bearing pair in the other direction has a keying slot (130) that runs radially through the center of rotation of the shaft. This keying slot (130) extends axially from the very end of shaft (38) towards the bearings. The shaft (38) is hollow in its entirety to provide space for shaft (40).

Shaft (40) is mounted internally to, and coaxially with, shaft (38) through bearings (132) and (134). Its extension outboard of the bearing pair on the same end as pulley (34) has multiple cylindrical surfaces that form a pulley (36). Its extension outboard of the bearing pair in the other direction is coaxially hollow for a distance to be described, and has a keying hole (136) corresponding to the keying slot (130) in shaft (38). This keying hole (136) extends axially as far inboard of the end of shaft (38) as does the keying slot (130). The keying hole (136) is approximately equal in width to the keying slot (130), and extends outboard of the end of shaft (38) a bit further than the inboard extension. Thus, a bar (138) as long as the outer diameter of shaft (38) and slightly smaller than the size of the keying slot (130), would be able to move axially to engage the keying slot (130) and thus pass torque from one shaft to another, or to disengage from the keying slot (130) and thus allow the two shafts to spin independently.

The position of the bar (138) is controlled as follows. Coil spring (140) resides in the coaxial hollow of shaft (40) between bar (138) and the end of the hollow. So located, it is always under compression so that the bar (138) must be driven by other means to achieve the above-described engagement. On the side of bar (138) opposite to spring (140) is attached a pin (142) that extends substantially beyond the end of shaft (40). This pin (142) serves to constrain the bar (138) radially and, when pushed towards the bearing pair against the force of spring (140), moves the bar (138) axially to engage keying slot (130) in shaft (38).

The extension of shaft (40) beyond the end of shaft (38) serves a second function beyond that of holding part of clutch mechanism (42). A pair of fins (102) is mounted to this shaft extension, the plane of the fins (102) including the axis of rotation of the shaft (40), and may or may not be orthogonal to the plane of motion of bar (138).

Thus a clutch mechanism (42) has been described in detail that transmits torque without slippage when engaged, is essentially free-wheeling with nil sliding friction when disengaged, and generates pure viscous energy dissipation when spinning. Those skilled in the art of mechanism design will be able to make variations in the details of mechanism as described, such as putting a pitch in the blades (102), providing multiple keying slots (130), extending bar (138) circularly so that it has multiple contact points, etc. All such variations are included in the spirit of the present invention as long as they fulfill the described function.

Referring now to FIG. 5, the controls required by the above-described disk drive will now be described. The lead (70) connects the coil (68) shown in FIG. 2, to the output of an amplifier (72) which can drive current through the coil (68) as required. An audio oscillator (76) drives amplifier (72) through summing junction (78) at a moderate frequency, for example, 500 Hz, at relatively low amplitude so that the head (2) is vibrated back and forth with an amplitude approximately equal to a quarter-track width. Such vibration will cause an amplitude modulation of the signal out of head (2) as playback is accomplished. This amplitude modulation contains information on the relative position of the head (2) with respect to the center line of the track being followed. With the mode switch (94) set to read (opposite to the position shown), this information on the relative position of the head (2) is recovered by sending the playback signal from head (2) through an envelope detector (80). Envelope detector (80) is essentially a full-wave rectifier and high-frequency filter. The output of the envelope detector drives a demodulator (82), which is controlled by the output from the audio oscillator (76). The function of the demodulator (82) is to change the information about the relative head-to-track center line spacing from sidebands around a carrier frequency (the frequency of the audio oscillator 76) to a DC referenced signal. The demodulator (82) may be a four-quadrant multiplier, or a synchronous rectifier, or similar circuit.

The output of the demodulator (82) is applied to the coil (68) via the summing junction (78) and the amplifier (72), and thus serves to move arms (62) and (4) so that head (2) stays on the center of the track being followed.

Referring again to FIG. 2, a flag (84) on head arm (4) is positioned to interrupt the light beam from lamp (86) falling on a photocell (88) when the head arm (4) is near the hub of disk (8). The output of the photocell (88) serves as a hub-limit signal input to the sequencing circuits (23) of FIG. 5. Similarly, when head arm (4) is near the rim of disk (8), flag (84) blocks the light beam from lamp (90) falling on a photocell (92), so that the output of photocell (92) serves as rim-limit signal input to the sequencing circuits (23) of FIG. 5.

Referring again to FIG. 5, the function of the sequencing circuits (22) will depend on the particular application to which the disk drive is put. When used with the high resolution electronic camera in the above-referenced copending application Ser. No. 06/265,411 of Armin Miller, et al., the sequencer performs as described below with reference to FIGS. 6–8.

Figure 6:
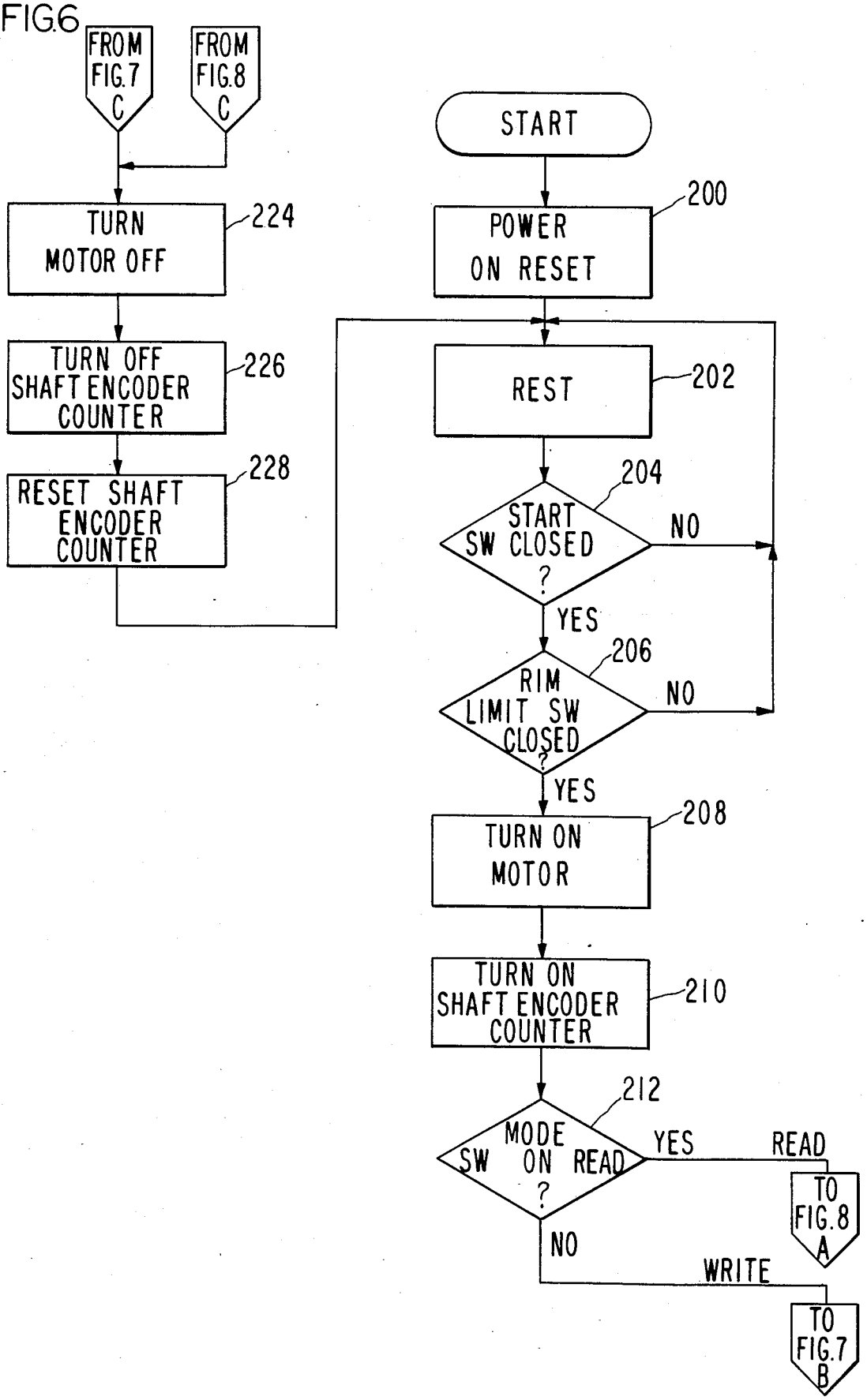

Referring now to the flow charts of FIGS. 6–8, the operating sequence is as follows. The starting conditions as a result of the power on reset (block 200) are that the motor and shaft encoder counters are off. The access hatch (not shown) is open, when means that the clutch (42) is disengaged, the head arm (4) is at its home position, and the flag (84) is blocking the light from lamp (86) to photocell (88), thereby generating a rim-limit signal. In order to record a picture, the user of this equipment would place an erased disk (8) into the disk drive and close the access hatch. Linkages (not shown) center and clamp the disk (8) to shaft (10) and cause clutch (42) to engage by means of the lever (141) shown in FIG. 1. In copending application Ser. No. 373,070 of Armin Miller, et al. the access hatch and disk-centering mechanism are shown in detail. The user then flips mode switch (94) to the write (record) position (the position shown in FIG. 5) and then initates the record operation by closing the start switch (96).

With the start switch closed (block 204), the sequencer (22) can check the rim-limit signal (block 206) to verify that the head arm (4) is in the correct position, then starts (block 208) the motor (12) by enabling the motor control circuits (14), and turns on the shaft encoder counter (block 210). The motor-control circuits (14) may be either a velocity servo (lower cost) or a phase-locked loop (more accurate).

Figure 7:
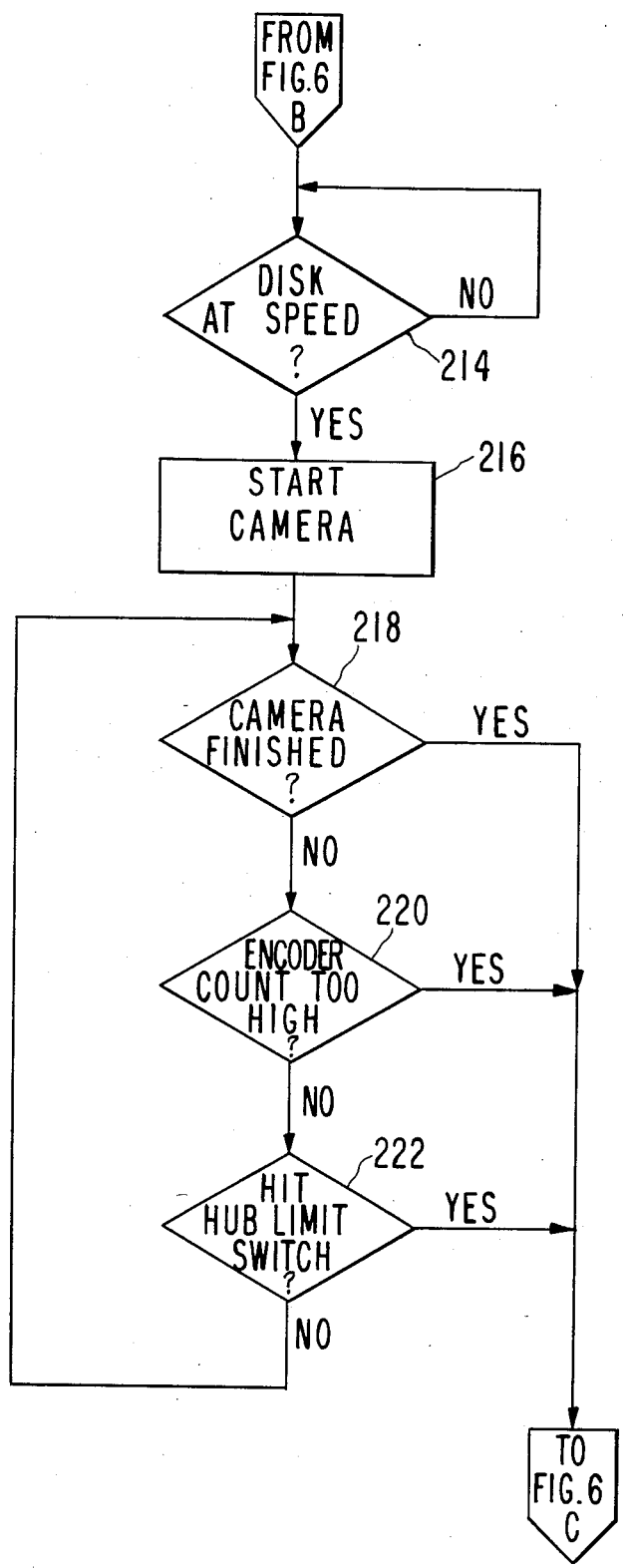

Since the mode switch is on write (block 212), the flow continues on FIG. 7. When the disk (8) is at speed (block 214), the camera is started by asserting (block 216) the camera-enable line (98). The camera mechanism (not shown) accelerates comparatively rapidly and then sends data to the record electronics (100), and recording commences. The audio oscillator (76) is disabled by the mode switch (94) during recording, so the head (2) rides smoothly across the disk. The pulses from shaft encoder (22) are used both to regulate the instantaneous disk speed and, since counting them gives an indication as to what radius the head (2) is at, to request ever-increasing disk speeds. This operating mode stops when either there is no more data coming from the camera (block 218), or the total shaft-encoder count indicates the head arm (4) is getting too close to the hub (block 220), or the hub limit signal is triggered (block 222). When either of these three conditions occurs, the flow returns to FIG. 6, the motor (12) is then stopped (block 224), and the system is quiescent until the disk access hatch is opened for removal of the disk. When the access hatch is opened, the clutch (42) is released and head arm (4) is returned to home position by spring (56), the spinning of fan (102) helping to dissipate the spring's stored energy. The shaft encoder counter is turned off (block 226) and reset (block 228).

The playback sequence is similar. The user places a disk (8) in the drive, closes the access hatch which engages the clutch (42), places the mode switch (94) to read or playback (opposite to the position shown in FIG. 5), and closes the start switch (96). With the start switch closed (block 204), the sequencer (22) first checks the rim-limit signal (block 206) to verify that the head arm (4) is in the correct position, then starts motor (12) (block 208). With the mode switch on read (block 212), the flow continues at FIG. 8.

Referring now to FIG. 8, the sequencer (22) sends a search signal (block 230), to summing junction (78) and enables the dither oscillator (block 232). The search signal causes head (2) to move slowly back and forth, about four cycles per revolution of the disk (8) in frequency and about one and one-half track widths in amplitude. The search signal guarantees that the previous recording will be found; there is no chance that the head (2) will slide into the gap area in between turns of the spiral. The search signal is stopped (block 238) when the data recovery circuits (104) indicate data is being recovered (block 234). If data is not found within ten revolutions of the disk (block 236), the disk is deemed blank and the search sequence is aborted by disabling the track search signal (block 240).

The read (playback) operating mode stops when either there is no more data coming from the disk (block 246), or the total shaft encoder count indicates the head arm (4) is getting too close to the hub (block 248), or hub-limit signal is triggered (block 250). When either of these three conditions occurs, the dither oscillator is disabled (block 252), the flow returns to FIG. 6, the motor (12) is then stopped (block 224), and the system is quiescent until the disk-access hatch is opened for removal of the disk. When the access hatch is opened, the clutch (42) is released, and head arm (4) is returned to home position by spring (56), the spinning of fan (102) helping to dissipate the spring's stored energy. The shaft encoder counter is turned off (block 226) and reset (block 228).

FIG. 5 includes a detailed diagram of the playback position controller which controls movement of the head arm (4) and dithering arm (62) shown in FIG. 2. The playback position controller includes a position feedback loop that is required to adequately control the dithering arm (62) so that the arms (4, 62) are not left free to vibrate between the springs (56, 66).

As shown in FIG. 2, the lamp (110) and the photocells (112, 114) are placed on opposite sides of the dithering arm (62) so that the lamp (110) illuminates the photocells and the light beam travels perpendicular to the plane of motion of dithering arm (62).

As shown in FIG. 5, the lamp (110) and photocells (112, 114) are further arranged so that photocell (114) is fully illuminated at all times, while photocell (112) is partially eclipsed by dithering arm (62) so that the amount of light that reaches photocell (112) changes as the dithering arm (62) moves. The photocell output currents are changed to voltatges by current-to-voltage converters (116, 118) and then used in separate servo loops. The converted output of photocell (114) is compared against a reference voltage, Vref, the results of the comparison being amplifier by amplifier (115) to drive the lamp (110). Thus the lamp output is held constant in spite of temperature changes and aging. The converted output of photocell (112) is processed by 10:1 lead network (120) and then sent to summing junction (78). Thus a position feedback loop is closed around dithering arm (62). Since the coil/magnet (68 and 74) is a force tranducer, the loop is a second-order loop. It is stabilized by the lead network (120). It will hold dithering arm (62) quite still in absence of any input requests, and will respond precisely to inputs when they exist.

It should be noted that the track-following mechanism described above involves some expense, and there is a way to reduce it. The clutch (42) may be placed on shaft (10) and modified so that it locks the shafts together at, for example, 20 different relative angular positions in contrast to the two different relative angular positions in the embodiment described. An index hole may be provided in disk (8) that is detectable by some means, for example, a lamp and photoelectric device. Clutch (42) may be electromagnetically operated. Assume that arm (4) will return to its home position as pulled by spring (56) with an acceptable accuracy; that is, in spite of the frictional loading in the several shaft bearings as multiplied by the several gear ratios. The start of a recording would include the following steps.

First, the disk is slowly rotated until the index hole is sensed. At this point, the clutch (42) is engaged electrically in response to the detection of the sensing hole. A similar rotation to the index hole will locate the start of a recorded track for playback. In this manner record and playback can be accomplished passively without actively monitoring the location of head (2) with respect to the center of the track being reproduced. The track width would have to be increased beyond the width used with the dithering method described previously, and the total data storage capability correspondingly decreased to absorb the inevitable manufacturing variations and component tolerances.

The above-described mechanisms can also be used for randomaccess data operations. Since the data is recorded in one continuous stream, the apparatus can be treated as a tape transport. The software of an attached computer has to accommodate the time delay to the particular part of the data that is of interest. There will be a delay anyway between the request for data on a particular disk and the insertion of that disk into the drive. Multiple accesses per disk insertion are possible when using a clutch equipped with an electromagnet. The sequencer is modified to decide if the address of interest is ahead of, or behind, the present head/disk position, and either spin the motor, or cycle the clutch to return the head to its home position and then spin the motor, as appropriate.

Rewrites of previous recordings are easily accomplished using the hole-in-the-disk mechanism (without track-following dithering) described immediately above. That is because the location of the track is known to the mechanism regardless of the magnetic existence of the track. The use of dynamic track-following (dithering) in playing back a previously-recorded track is required when greater performance is desired. There are both operational and manufacturing limitations to be dealt with. The initial angular position of the disk is an example of an operational limitation, while the actual pitch of the spiral generated is an example of a manufacturing limitation. A way to determine, and make corrections for, the initial angular position has been described.

There are two ways to deal with the pitch of the spiral. First, the disk can be initialized with a spiral track that records the entire disk. The sequencer must be modified to alternate between writing and reading during rewrite. First the sequencer would write for awhile, then read where the track is and initiate a course correction, then write some more, then read again. Second, the writing of another block of data would commence after reading back the block previous to the proposed location of the new block, recording the correction signals fed to the track-following motor in the process. Then the geometry of the previous disk/drive operation would be known to the present disk drive, and the present recording can be done appropriately. This must be done with some caution, however. The operation of rewriting 100 revolutions of data after tracking previous recordings for two revolutions would have to be broken up several times to gather more tracking information. Extending a short spiral into virgin territory would be, however, no problem.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A disk drive for recording and reproducing information in a single-spiral, magnetically-recorded data track on the surface of a disk, comprising:

a record/playback arm including a transducer for recording and reproducing data signals with respect to said disk;

first-moving means for moving said record/playback arm such that said transducer is moved generally along a radius of said surface of said disk, between the rim of said disk and the center of said disk;

second-moving means for spinning said disk;

control means, coupled to said first-moving means and to said second-moving means, for coordinating the motion of said first-moving means and said second-moving means so that said transducer traces a spiral pattern across said surface of said disk;

said first-moving means including a cable, one end of said cable being wound around a drum, the other end of said cable being connected to said record/playback arm, such that as said drum is turned said cable is wound or unwound therefrom to thereby cause said record/playback arm to move across said disk toward or away from said center of said disk;

dithering means coupled to said cable between said record/playback arm and said drum for providing a relatively high-frequency, low-amplitude oscillation of said cable to thereby impart a similar oscillation to said transducer in a direction which is orthogonal to said data track; and, means coupled to said transducer and to said dithering means for utilizing said data signals reproduced by said transducer from said recorded data track to maintain said transducer on the center of said recorded-data track as said transducer is moved across said surface of said disk.

2. A disk-drive apparatus for recording and reading information in a spiral track on a spinning disk, comprising:

a record/playback arm;

transducing means mounted on said record/playback arm such that said transducing means can be moved by said record/playback arm along a radius of said disk;

said transducing means including means for reading data signals recorded on said disk;

second-moving means for spinning said disk;

first-moving means for causing said record/playback arm to move with respect to said disk, such that when activated, said record/playback arm-moving means causes said record/playback arm to be moved in a first direction along said radius of said disk, and when deactivated said record/playback arm-moving means allows said record/playback arm to be moved in a second direction along said radius of said disk;

said first-moving means including a cable, one end of said cable being wound around a drum, the other end of said cable being connected to said record/playback arm, such that as said drum is turned said cable is wound or unwound therefrom to thereby cause said record/playback arm to move across said disk toward or away from said center of said disk;

control means, capable of being engaged and disengaged, connected to said first moving means and to said second-moving means for, when engaged, causing said record/playback arm to be moved across said disk in synchronism with the spinning thereof to thereby cause said transducing means to trace a spiral track on said disk;

dithering means coupled to said cable between said record/playback arm and said drum for providing a relatively high-frequency, low-amplitude oscillation of said cable tothereby impart a similar oscillation to said transducing means in a direction which is orthogonal to said data track; and, means coupled to said transducing means and to said dithering means for utilizing said data signals reproduced by said transducer from said recorded data track to maintain said transducing means on the center of said recorded-data track as said transducing means is moved across said surface of said disk.

3. The combination in accordance with claim 2 wherein said control means includes an input and an output such that when said control means is engaged, said input is connected to said output, and when said control means is disengaged, said input is disconnected from said output; said combination further comprising:

motive-power means;

driving means connected to said motive-power means and to the input of said control means for causing the input of said control means to be driven by said motive-power means; and, means for connecting said output of said control means to said first-moving means such that when said control means is engaged, said first-moving means is activated, and when said control means is disengaged, said first-moving means is deactivated.

4. The combination in accordance with claims 2 or 3 wherein said second-moving means for spinning said disk further includes a shaft encoder for producing pulses proportional to the angular position of said disk, the cumulative total number of said pulses from said shaft encoder being related to the instantaneous radius on said surface of said disk at which said transducing means is located; and, wherein said control means further comprises means responsive to said shaft encoder for using said pulses to regulate the instantaneous disk speed of said second-moving means and for requesting ever-changing disk speeds of said second-moving-means as said record/playback arm moves from one extreme of its travel to the other extreme of its travel.

5. A disk-drive apparatus for recording and reading information in a spiral track on a spinning disk, comprising:

a record/playback arm;

transducing means mounted on said record/playback arm such that said transducing means can be moved by said record/playback arm generally along a radius of said disk;

means for spinning said disk;

motive-power means;

control means including clutch means for, when engaged, connecting said motive-power means to said record/playback arm-moving means and for, when disengaged, disconnecting said motive-power means from said record/playback arm-moving means;

said record/playback arm moving means comprising a cable, one end of said cable being wound around a drum, the other end of said cable being connected to said record/playback arm, such that as said drum is turned said cable is wound or unwound therefrom to thereby cause said record/playback arm to move across said disk toward or away from said center of said disk, and spring tensioning means connected to said record/playback arm for urging said record/playback arm in a direction which is opposite to the direction in which said cable urges said record/playback arm;

record/playback arm-moving means for causing said record/playback arm to move with respect to said disk, such that when activated, said record/playback arm-moving means causes said record/playback arm to be moved in a first direction along said radius of said disk, and when deactivated, said record/playback arm-moving means causes said record/playback arm to be moved in a second direction along said radius of said disk;

said record/playback arm-moving means further including means coupled to said cable between said record/playback arm and said drum for imparting a dithering motion to said cable to thereby impart a similar motion to said record/playback arm; and, means for connecting said output of said control means to said record/playback arm-moving means, such that when said control means is engaged, said record/playback arm-moving means is activated, and when said control means is disengaged, said record/playback arm moving means is deactivated;

said connecting means further including means operative upon the condition that said control means is disengaged, and said record/playback arm-moving means is thereby deactivated for rapidly causing said record/playback arm to travel in said second direction.

6. The combination in accordance with claim 5 wherein said means for imparting a dithering motion to said record/playback arm comprises:

a dithering arm;

means for imparting motion to said dithering arm; and, means for translating the motion of said dithering arm to said cable.

7. The combination in accordance with claim 6 wherein said for imparting motion to said dithering arm comprises:

a electromotive coil which, when energized, urges said dithering arm in one direction; and, spring-tensioning means connected to said dithering arm for pulling said dithering arm in a direction opposite to said one direction.

8. The combinations in accordance with claims 6 or 7 further comprising:

oscillator means;

detection means connected to said transducer for determining the relative position of said transducer with respect to the center line of said recorded-data track being followed; and, means, connecting said detection means and said oscillator means to said means for imparting motion to said dithering arm, for causing said dithering arm to impart motion to said record/playback arm in a feedback servo loop such that said transducer means is urged closer to said center line of the data track being followed.

* * * * *